J. B. BAXTER.
HAME FASTENER.
APPLICATION FILED AUG. 5, 1912.

1,122,059.　　　　　　　　　　　Patented Dec. 22, 1914.

Witnesses:
Jas. E. Hutchinson
Gertrude Wedemeier

Inventor:
John B. Baxter
By Ralem Nilaus, Attorneys

UNITED STATES PATENT OFFICE.

JOHN BROWN BAXTER, OF WATERVLIET, NEW YORK, ASSIGNOR TO COVERT MANUFACTURING COMPANY, OF WATERVLIET, NEW YORK, A CORPORATION OF NEW YORK.

HAME-FASTENER.

1,122,059.     Specification of Letters Patent.     Patented Dec. 22, 1914.

Application filed August 5, 1912. Serial No. 713,321.

*To all whom it may concern:*

Be it known that I, JOHN BROWN BAXTER, citizen of the United States, residing at Watervliet, in the county of Albany and State of New York, have invented certain new and useful Improvements in Hame-Fasteners, of which the following is a specification, reference being had therein to the accompanying drawing.

This invention relates to hame fasteners and has to deal more particularly with a fastener of the general character disclosed in the application of Fred W. Covert Serial No. 614,505, filed March 14, 1911, it being the primary object of the present invention to provide in connection with a fastener of the character stated novel locking means whereby the fastener, when positioned in place, will be prevented from becoming accidentally released from its fastening.

In the application referred to a fastener is provided embodying a relatively flat body part having a hook at one end and a pivoted lever adapted for connection with a link or the like for the usual chain of the fastener and being of a construction that when closed it will assume a position overlying and against the body part.

It is contemplated by the present invention to arrange in operative association with the body part and lever, improved locking means, one that is highly efficient in use and so arranged with relation to the lever that it does not interfere with the convenient manipulation of the latter when the same is freed from said locking means.

The invention further includes novel supporting means for the locking member whereby the latter is firmly supported on the body of the fastener and arranged at a point where it offers the least obstruction.

More particularly the invention includes a body part comprising oppositely disposed sides, a hook secured at one end of the body part, a lever pivoted adjacent the opposite end and between the sides of the body part, and a lock pivotally supported between the sides of the body part and adapted to engage a coöperating part intermediate the ends of said lever.

Other and further improvements will be appreciated from the detailed description to follow which for a clear understanding of the invention should be considered in connection with the accompanying drawings forming a part hereof and wherein is disclosed for the purpose of illustration a convenient embodiment of the invention.

Figure 1:
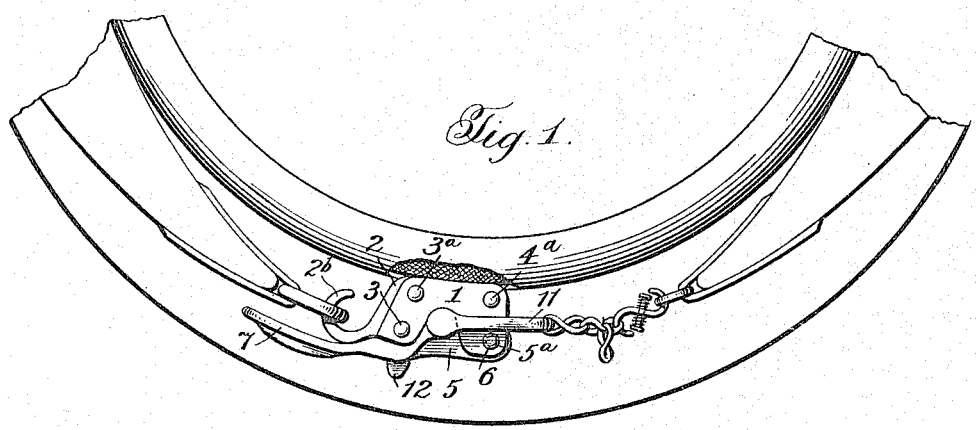
Figure 2:
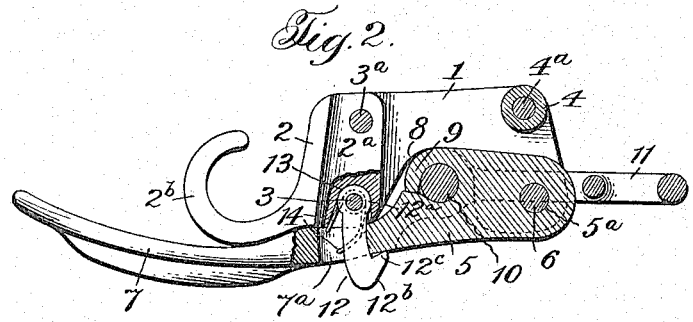
Figure 3:
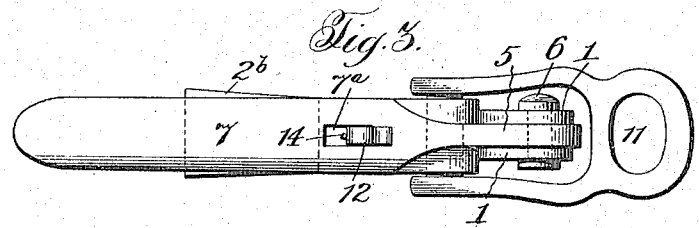
Figure 4:
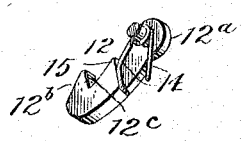

In the drawings: Figure 1 is a side view of the fastener applied to the collar; Fig. 2 is an enlarged side elevation of the fastener with parts shown in section; Fig. 3 is a bottom plan view of the fastener; and Fig. 4 is a detail perspective view of the locking dog.

With more particular reference to the drawings a body part is provided, the same being relatively flat and comprising oppositely disposed separated sides 1. Adjacent one end of the body part is a suitable hook member the same comprising a main part 2 adapted to lie flat against one end of the body part and having a tongue $2^a$ adapted to be positioned between the sides of the body part and an open mouth curved hook part $2^b$. The hook is conveniently secured, as by pintles or bolts 3 and $3^a$, and it will be appreciated that the tongue $2^a$ of the hook affords a suitable spacing means for separating the sides 1 of the body part. An auxiliary spacing member 4 is arranged adjacent the upper edge at the opposite end of the body, the same being supported in place by a pintle $4^a$. A suitable lever is provided, the same having a relatively thin tongue member 5 of a width to loosely fit between the sides of the body part, the same being pivotally supported as by a suitable pintle 6 projecting between the sides 1 and passing through an aperture $5^a$ in the tongue of the lever. The opposite end of the lever takes the form of a relatively wide smooth surfaced arm 7 free from connection and projecting to a point beyond the hook member $2^b$, the said arm being preferably curved so as to conform with the curvature of the edge of the body part as well as the surface of the hook member $2^b$ as will be seen from reference to Figs. 1 and 2. The body part is provided with a cut-out portion 8 extending from the edge thereof inwardly, and the operating lever is provided with an inwardly projecting lip 9 formed of an integral projection of the lever and being of bendable metal whereby it is adapted to be bent around an end bar 10 of a suitable link member 11 adapted for connection with a chain, as shown. It will be observed that the recess 8 provides a suitable seat for the reception of the lever formed by its means of connection with the link aforesaid.

It is further desirable that the parts be held in position whereby in operation of the device the chain will not become loosened or released by the accidental movement of the lever on its pivot, and with a view to accomplishing this result I provide a suitable locking mechanism, preferably formed as follows: 12 is a locking dog, the same having a shank 12$^a$ apertured whereby it may be sleeved upon a suitable pivot member or pintle and I preferably take advantage of the securing bolt 3 for this purpose. The tongue 2$^a$ of the hook is provided with a recessed part 13 for the reception of the shank 12$^a$ of the dog, the wall surrounding said recess forming means for limiting the back and forth movement of the dog, and the side walls surrounding the recess forming suitable guides in the pivotal or swinging movement of the dog.

A spring member is provided for normally holding the dog against one of the end walls of the recess, said spring member preferably taking the form shown at 14, one end being coiled about the pivot bar or bolt 13 and the opposite end being extended to engage against an offset shoulder 15 on one side of the locking dog. The arm 7 of the lever is provided with an elongated recess 7$^a$ adapted for the reception of the dog 12. In operation the spring being arranged to hold the shank of the dog 12 adjacent one end wall of the recess an inclined or cam part 12$^b$ of the hook will ride over one of the end walls of the slot of the lever in the closing movement of the latter, and when the locking edge 12$^c$ passes through said slot of the lever the same will be moved by the action of the spring into locking position over the outer surface of the lever adjacent the slot. When it is desired to operate the lever whereby to release the fastener it is only necessary for the operator to force the dog or hook 12 about its pivotal support against the action of the spring and to impart outward swinging movement to the lever when the dog will readily pass through the slot of the lever. It will be observed that the locking means does not interfere in the least with the ready and convenient operation of the lever since the dog is spaced from the free end or hand gripping part of the lever, and it will also be noted that the locking dog is so arranged on the hook that it offers no obstruction beyond the sides thereof and at the same time it is firmly supported by the body of the hook.

I claim:—

1. In a hame fastener, the combination of a body part, comprising opposed side plates and spacing means, a hook secured at one end to the body part, a lever having a tongue pivoted between the sides of the body part at the opposite end thereof, said lever having retaining means intermediate its ends, a link pivotally secured to the lever by said retaining means, and a spring held pivotally mounted securing hook positioned on the body part and offering no obstruction beyond the sides of the body part, and said lever having a recess intermediate its ends adapted to receive said hook whereby the hook will retain the parts in position.

2. In a hame fastener, the combination of a body part having at one end a hook and a recess intermediate its sides adjacent the opposite end, a lever pivoted at one end in said recess and having a free end to engage over the body part and hook, said body part having a cut out part in one edge, means on the lever to engage a chain link or the like and adapted to engage in said cut-out part, and a lock interposed between said body part and the lever intermediate its ends and spaced from the free or hand engaging end of the lever.

3. In a hame fastener, the combination of a body part having at one end a hook and a recess intermediate its sides adjacent the opposite end, a lever pivoted at one end in said recess and having a free end to engage over the body part and hook, said body part having a cut-out part in one edge, means on the lever to engage a chain link or the like and adapted to engage in said cut-out part, and a spring actuated locking dog positioned intermediate the sides of the body part and projecting beyond the edge of the body part, and said locking dog having an overhanging part to engage over the lever, substantially as and for the purpose described.

4. In a hame fastener, a body part having a recess intermediate its sides, a lever pivoted to said body part and adapted for connection to a chain link or the like, a hook having an extended body part adapted to fit against one end of the body part and having a flange projecting therefrom and adapted to fit in the recess of the body part, the said flange having a recessed part, and a locking dog pivoted to the body part and projecting through said recess of said flange, said lever having an engaging part adapted to be engaged by said locking dog.

5. In a hame fastener, a body part having at one end a curved hook, the bill of which offers no obstruction beyond the lower edge of the body part, a lever pivoted adjacent the upper edge of the body part at the end thereof opposite the hook, the operating end of the lever being adapted when in closed position to rest upon the back of the hook, and said lever having intermediate its ends a recess, a link pivotally secured to the lever intermediate its ends, and a spring held locking dog positioned on the body part adjacent the upper edge thereof and extending in a direction opposite to that of the bill of the hook, said recess of the lever being adapted to receive the dog in the closed position of the lever to lock the parts in position.

6. In a hame fastener, a body part comprising oppositely disposed sides, a hook having a part projecting between the sides of the body part and secured to the latter, said projecting part of the hook being relatively thin and constituting a spacing medium for the sides of the body part, a lever having a relatively thin tongue to engage between the sides at the opposite end of the body part and mounted on the latter for pivotal movement, a link connected with the lever intermediate its ends, and locking means interposed between the lever and body part.

In testimony whereof I affix my signature in presence of two witnesses.

JOHN BROWN BAXTER.

Witnesses:
JOHN J. CARROLL,
GEORGE H. LEE.

Copies of this patent may be obtained for five cents each, by addressing the "Commissioner of Patents, Washington, D. C."